US012435193B2

(12) United States Patent
Kelkar et al.

(10) Patent No.: US 12,435,193 B2
(45) Date of Patent: Oct. 7, 2025

(54) REPAIR SHAPE AND TECHNIQUE FOR COMPOSITE LAMINATES

(71) Applicant: North Carolina Agricultural and Technical State University, Greensboro, NC (US)

(72) Inventors: Ajit D. Kelkar, Greensboro, NC (US); Mohammad B. Uddin, Greensboro, NC (US); Shashwata Chakraborty, Greensboro, NC (US)

(73) Assignee: North Carolina Agricultural and Technical State University, Greensboro, NC (US)

( * ) Notice: Subject to any disclaimer, the term of this patent is extended or adjusted under 35 U.S.C. 154(b) by 441 days.

(21) Appl. No.: 17/751,351

(22) Filed: May 23, 2022

(65) Prior Publication Data

US 2022/0372237 A1 Nov. 24, 2022

Related U.S. Application Data

(60) Provisional application No. 63/191,885, filed on May 21, 2021.

(51) Int. Cl.
*C08J 5/24* (2006.01)
*C08J 5/12* (2006.01)

(52) U.S. Cl.
CPC .............. *C08J 5/243* (2021.05); *C08J 5/124* (2013.01); *C08J 2363/00* (2013.01)

(58) Field of Classification Search
CPC ......... C08J 5/243; C08J 5/124; C08J 2363/00
USPC ........................................................ 156/94
See application file for complete search history.

(56) References Cited

U.S. PATENT DOCUMENTS

| 2,692,425 | A | | 10/1954 | Martin |
| 4,978,404 | A | | 12/1990 | Westerman, Jr. |
| 5,034,254 | A | * | 7/1991 | Cologna ................ B29C 73/14 |
| | | | | 428/116 |
| 9,114,576 | B2 | | 8/2015 | Bolick et al. |
| 9,190,222 | B1 | | 11/2015 | Zhang et al. |
| 9,492,975 | B2 | | 11/2016 | Dan-Jumbo |
| 2012/0304433 | A1 | | 12/2012 | Roux et al. |
| 2019/0182996 | A1 | | 6/2019 | Kelkar et al. |
| 2019/0232614 | A1 | | 8/2019 | Hasan |
| 2021/0138741 | A1 | | 5/2021 | Kelkar et al. |

OTHER PUBLICATIONS

Gopalakrishnan et al., "Novel patch shape design to repair pi/4 quasi-isotropic E-glass/epoxy laminate under uniaxial tensile loading condition." Polym. Polym. Comp., vol. 27(3), pp. 108-134 (2019).

* cited by examiner

*Primary Examiner* — James D Sells
(74) *Attorney, Agent, or Firm* — Jenkins, Taylor & Hunt, P.A.

(57) ABSTRACT

Methods of repairing damaged composites are described. The damaged composites can comprise a polymeric matrix and one or more layers of fibers (e.g., carbon or glass fibers). According to the described method, the damaged area of the composite is replaced by an insert comprising a core geometry and radial projections. The insert can comprise the same polymeric matrix and one or more layers of fibers as the original composite of the damaged composite. The method can provide a repaired composite with greater compressive strength and/or greater tensile strength than a composite repaired with a traditional patch having no radial projections.

10 Claims, 11 Drawing Sheets

REPAIR SHAPE AND TECHNIQUE FOR COMPOSITE LAMINATES

RELATED APPLICATIONS

The presently disclosed subject matter claims the benefit of U.S. Provisional Patent Application Ser. No. 63/191,885, filed May 21, 2021; the disclosure of which is incorporated herein by reference in its entirety.

TECHNICAL FIELD

The presently disclosed subject matter relates to methods for repairing composite laminates. The methods comprise the use of inserts/patches comprising composite material and having a core geometry, typically circular, with radial projections.

BACKGROUND

In the last few decades, the use of lightweight composite materials has increased dramatically. Composites, including but not limited to carbon- and glass fiber-reinforced polymers, have found increasingly wide applications not only in the aerospace, transportation, and defense industries, but are also gaining increasing market share in civil infrastructure applications due to their unique advantages over traditional metal and concrete materials. Carbon fiber reinforced composites (CFRC) have many advantages over conventional materials like steel and aluminum. Their high strength-to-weight ratio, ease of molding, superior tensile properties, and many other structural advantages have made them popular, particularly in the aircraft industry. Composites can be exposed to various types of loads, including but not limited to axial, flexural, fatigue, impact, etc. Impact loading, for example, can cause severe damage to a composite laminate, in some cases leading to catastrophic failure. Unfortunately, current methods of repairing composites can be cumbersome and can yield a repaired composite that is substantially weaker than the original composite.

Accordingly, there is an ongoing need for effective and efficient methods to repair damaged composite materials. For example, there remains a need for an effective method for repairing composite materials in a manner that does not lead to substantial weakening of the composite itself.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In some embodiments, the presently disclosed subject matter provides a method of repairing a damaged composite, the method comprising: (a) providing a composite comprising a polymeric matrix and one or more layers of fibers, wherein said composite has a damaged area; and (b) replacing the damaged area of said composite with an insert comprising a core geometry and radial projections.

In some embodiments, said insert comprises a circular patch with radial projections. In some embodiments, said insert and said composite comprise the same polymeric matrix and the same one or more layers of fibers. In some embodiments, said one or more layers of fibers comprise carbon fibers or glass fibers. In some embodiments, said one or more layers of fibers comprise at least 4 layers. In some embodiments, said insert comprises 8, 12, 16, 20, or 24 radial projections. In some embodiments, said insert comprises a circular patch with at least 16 radial projections. In some embodiments, said polymeric matrix of the composite is prepared from an epoxy resin and a curing agent.

In some embodiments, one or both of a compressive strength and a tensile strength of said damaged composite repaired with an insert comprising a circular patch with radial projections is greater than one or both of a compressive strength and a tensile strength of a damaged composite repaired using a circular patch with no radial projections.

In some embodiments, said damaged composite is a part of an airplane, a spaceship, a car, a truck, a boat, a building, a civil infrastructure installation or a piece of sporting equipment and said replacing occurs in situ.

In some embodiments, the presently disclosed subject matter provides a repaired composite comprising a polymeric matrix and one or more layers of fibers further comprising a composite insert comprising a core geometry with radial projections. In some embodiments, said insert comprises a circular patch with radial projections. In some embodiments, said insert comprises 8, 12, 16, 20, or 24 radial projections. In some embodiments, said insert comprises a circular patch with at least 16 radial projections.

In some embodiments, said insert and repaired composite each comprise the same polymeric matrix and the same one or more layers of fibers. In some embodiments, said one or more layers of fibers comprises at least about 4 layers of carbon fibers or at least about 4 layers of glass fibers. In some embodiments, said one or more layers of fibers comprise plain weave, twill, satin, or 8 harness satin weave.

In some embodiments, one or more of a compressive strength or a tensile strength of the composite repaired with an insert comprising a circular patch with radial projections is greater than a compressive strength or a tensile strength of a composite repaired using a traditional circular patch.

In some embodiments, said composite is a part of an airplane, a spaceship, a car, a truck, a boat, a building, a civil infrastructure installation or a piece of sporting equipment.

Accordingly, it is an object of the presently disclosed subject matter to provide a method for repairing composites. In some embodiments, the composites are woven composite laminates.

An object of the presently disclosed subject matter having been stated hereinabove, and which is achieved in whole or in part by the presently disclosed subject matter, other objects will become evident as the description proceeds when taken in connection with the accompanying drawings as best described herein.

Figure 1B:
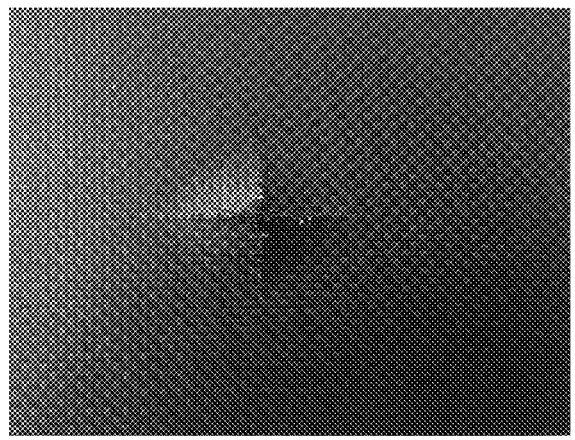
FIG. 1B is an image of the back of a composite laminate with impact damage.

It will be understood that the drawings are for the purpose of describing preferred embodiments of the presently disclosed subject matter and are not intended to limit the presently disclosed subject matter thereto.

DETAILED DESCRIPTION

In some embodiments, the presently disclosed subject matter provides a method of repairing composite laminates using an innovative patch geometry. In some embodiments, the presently disclosed subject matter provides a method of repairing composite laminates prepared, e.g., using heat vacuum assisted resin transfer molding (HVARTM) technique using plain weave carbon fibers and epoxy resin or using a prepreg. Such repairs can be made in situ, which increases the applicability and decreases the cost of the method of repair, especially for complex composites.

The presently disclosed subject matter will now be described more fully. The presently disclosed subject matter can, however, be embodied in different forms and should not be construed as limited to the embodiments set forth herein below and in the accompanying Examples. For example, features illustrated with respect to one embodiment can be incorporated into other embodiments, and features illustrated with respect to a particular embodiment can be deleted from that embodiment. Thus, one or more of the method steps included in a particular method described herein can, in other embodiments, be omitted and/or performed independently. In addition, numerous variations and additions to the embodiments suggested herein, which do not depart from the presently disclosed subject matter, will be apparent to those skilled in the art in light of the instant disclosure. Hence, the following description is intended to illustrate some particular embodiments of the presently disclosed subject matter, and not to exhaustively specify all permutations, combinations and variations thereof. It should therefore be appreciated that the presently disclosed subject matter is not limited to the particular embodiments set forth herein. Rather, these particular embodiments are provided so that this disclosure will more clearly convey the full scope of the presently disclosed subject matter to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. References to techniques employed herein are intended to refer to the techniques as commonly understood in the art, including variations on those techniques or substitutions of equivalent techniques that would be apparent to one of skill in the art.

Following long-standing patent law convention, the terms "a", "an", and "the" refer to "one or more" when used herein, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or."

As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed subject matter can include the use of either of the other two terms.

Unless otherwise indicated, all numbers expressing quantities of weight, mass, volume, time, activity, percentage (%), and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

As used herein, "composite" or "composite material" refers to a combination of two or more materials. The materials generally possess different physical or chemical properties that remain separate and distinct on a macroscopic level within the finished product. For example, a fabric (or fiber) may be considered one material and a resin another material. The fiber reinforcements of the fabric or fiber in a composite can provide mechanical properties such as stiffness, tension and impact strength. The resin material can provide physical characteristics such as resistance to fire, weather, ultraviolet light and chemicals.

As used herein, a "fiber" is a long strand of a material, such as a strand comprising a carbon or glass material, the length dimension of which is much greater than the transverse dimensions of width and thickness. The fiber is preferably a long, continuous strand rather than a short segment of a strand referred to in the art as a staple fiber. A strand is a single, thin length of something, such as a thread or fiber. The cross-sections of fibers for use herein may vary widely, and they may be circular, flat or oblong in cross-section. They also may be of irregular or regular cross-section. Thus, the term "fiber" includes filaments, ribbons, strips and the like having regular or irregular cross-section.

A fiber layer may comprise any type of unidirectional or multi-axial fabric, including a single-ply of unidirectionally oriented or randomly oriented (i.e. felted) non-woven fibers, a plurality of plies of non-woven fibers that have been consolidated into a single unitary structure, a single-ply of woven fabric, a plurality of woven fabric plies that have been consolidated into a single structure, a single-ply of knitted fabric or a plurality of knitted fabric plies that have been consolidated into a single structure. In this regard, a "layer" describes a generally planar arrangement having an outer top (first) planar surface and an outer bottom (second) planar surface.

The "fabric" or "fiber" in a composite can be woven or non/woven. Fibers can be made of glass or carbon materials.

A prepreg generally comprises one or more layers of resin-impregnated fibers. As is familiar to those of skill in the art, to prepare a composite from a prepreg, heat is applied, causing the embedded matrix resin to flow, thereby enabling bonding of the layer(s). The heat can additionally cure or polymerize the matrix resin.

As used herein "radial projections" as in "a circular patch with radial projections" or "CPRP" refers to radial projections extending from the body of an object (e.g., an insert), wherein the body of the object is generally the shape of a circle, wherein the periphery is modified with radial projections. Since impact loads usually result in circular damage, the core geometry of the insert of the present disclosure is generally circular (e.g., when viewed two-dimensionally, such as looking at the top or bottom of the insert and not taking into account insert thickness), however other core geometries are possible, including oblong, such as an oval, or a rounded rhombus, rounded diamond, or rounded teardrop, and will be determined by the geometry of the damage. Thus, more generally "radial projections" can refer to projections outward from the perimeter of a core geometry, collinear to a radius of the core geometry, i.e., a line from the center of an object to the perimeter of the object when viewed in two-dimensions (i.e., not taking into account thickness). The radial projections provide finger like extensions which effectively entangle with the original, undamaged composite, while at the same time stretching into the central area of the repair path. The radial projections provide a high bonding area within a relatively small space and provide an efficient load transfer to the patch itself. Stated another way, the bonding area between the patch and the damaged composite can correspond to the perimeter around the side the patch. For example, compared to a conventional circular patch, where the bonding area corresponds to the circumference of the circle, the radial projections of the CPRP can result in a patch with an over similar diameter, but much larger perimeter. A higher bonding perimeter is obtained with the radial projections of the presently disclosed insert; assuming there are n projections and the projection length is L and the projection width is W, then the additional perimeter is [(2*L)+W]*n.

The inserts, e.g. circular patches with radial projections, disclosed herein can be cut out of fiber composites using techniques well-known in the art. For example, such patches can be cut out using a water jet cutter or CNC (Computer Numerical Control) machine. It is even possible, in some circumstances, to cut the patch out manually.

As used herein, "damage" or "damaged" such as "damaged composite" refers to through-thickness penetration, as generally resulting from high velocity impact or delamination, as generally resulting from low velocity impact, bending, tensile and shear forces or due to matrix cracking, fiber failure and/or interlaminar failures. The term "damaged composite" can refer to a composite containing damage; a composite with the damage removed, but prior to repair; and in some embodiments, to original remaining composite in a repaired composite. The term "damaged area" refers to an area in a damaged composite comprising damage. Thus, "damaged area" can include all of the damage in a given composite or only a portion of the total damage.

II. General Considerations

The higher strength-to-weight of composite materials, as well as their stiffness has made them popular, particularly in the aviation industry where composites are replacing some of the all-metal body structures used in older jetliners, increasing fuel economy without sacrificing safety and efficiency. Aircraft are regularly exposed to abrupt changes in loading conditions, including but not limited to low and high velocity impact, bending, tensile and shear force, and hoop stress. Long-term use factors like fatigue, age, and corrosion result from the continuous operation of such aircraft, which additionally are exposed to large fluctuations in temperature, pressure, moisture, dust, UV exposure and other conditions, which can also play a role in composite wear and aging. Not all parts of an aircraft are exposed to the same types of loads at the same time or even the same scale. As a result, manufacturers have different criteria for individual parts. For example, priority is on durability and damage tolerance for a fuselage; for wings, the focus is on strength.

Although in most aspects composite materials have surpassed metal, repairs stand out as one of the few areas where metals are generally superior. Metals have an easy and universal repairing process, i.e., welding, where excessive heat melts both the base and filler metals and creates a brand-new joint upon cooling. A good weld ensures the strength and integrity of the repaired part, which is at least the same if not higher than the original undamaged part. In contrast, for composites, the repair process is generally quite cumbersome. In particular, for composites comprising heat-sensitive polymers, such as thermosetting polymers, heat can cause the material to disintegrate.

In the 1980's, composite parts were repaired using bolted joints similar to metal parts. More recently, bonded patch repair and then tapered scarf repair have become common. However, there are still some challenges. For example, technological progress in maintenance and repair has not kept pace with the rapid development of composite products despite the safe and efficient operation of composite parts being largely dependent on high frequency repair and maintenance techniques. One frequently encountered damage to composites is low velocity impact. Unlike metals, which are ductile and hence capable of absorbing energy, upon impact, both fibers and matrix in a composite are fractured (including matrix-cracking and fiber-breakage) in the process of absorbing energy. Although the fibers in a composite generally exhibit superior in-plane characteristics, they are vulnerable to transverse loading due to their directional properties. At high velocity impact, the through-thickness penetration results in localized damage to the composite. At low velocity, the subsurface nature of damage (e.g. delamination) can make detection difficult and can eventually result in catastrophic failure during later cyclic loading. Low velocity impact can also cause significant deterioration of properties in tensile, shear and compressive strengths. After such damage occurs, the composite can be thoroughly studied to find out the exact position and extent of the damage to determine the feasibility of either repairing or replacing the damaged component. If damage is not widespread, repair can preserve the undamaged material and uses less time and labor compared to replacement of the component part. However, there is currently no recommended surface treatment compatible for all composite types.

Some attempts have been made to design repair inserts having shapes other than the typical circular patch, which has long demonstrated the lowest stress concentration. Examples of such more recent inserts include square-, octagon-, and even butterfly-shaped inserts. However, such shapes do not give superior load distribution. In particular, the corners of the shapes can cause stress concentration, leading to early failure of the repaired composite.

According to some embodiments, the presently disclosed subject matter provides a method for the repair of composite laminates. For example, as described hereinbelow, in an exemplary embodiment of the presently disclosed subject matter, composite laminates were fabricated using plain weave carbon fibers and epoxy resin via a heated vacuum assisted resin transfer molding (HVARTM) technique, such as described in U.S. Pat. No. 9,114,576, the disclosure of which is incorporated herein by reference in its entirety. Plain weave carbon fabric laminae were stacked together and infused with epoxy resin to fabricate laminates. The cured laminates were subjected to low-velocity impact loading, yielding a damaged area. The resulted damage areas were cut out of the laminates, for example using a water jet cutter, (to create voids in the damaged composites) and replaced with laminate patch inserts having a core geometry with radial extensions. The patch inserts were bonded to the original laminates using epoxy resin and cured (at about 250° F. (121.1° C.)). The compressive strengths of the repaired laminates were compared with undamaged laminates and with non-repaired, impact damaged laminates.

Thus, in some embodiments, the presently disclosed subject matter provides a method of repairing a damaged composite, wherein said composite comprises a polymeric matrix and one or more layers of fibers, the method comprising: (a) providing a composite having a damaged area; and (b) replacing the damaged area of the composite (where said damaged area can include all of or only a portion of the damage in the composite) with an insert comprising a core geometry and radial projections. Thus, the method can include replacing at least one area of damage in a damaged composite with at least one insert. In some embodiments, the replacing comprises cutting around the damaged area to create a void in the composite, wherein the void has a shape corresponding to the insert; inserting the insert into the void, applying a resin (e.g., around the periphery of the insert), and curing the resin. In some embodiments, the insert comprises a composite. The core geometry (i.e., the shape of the insert when viewed looking directly at the top or bottom of the insert) can be any suitable shape, In some embodiments, the insert has a circular core geometry and thus, the insert is a circular patch with radial projections (CPRP).

In some embodiments, the presently disclosed subject matter provides a composite repaired by a method disclosed herein.

In some embodiments, the presently disclosed subject matter provides a composite comprising a composite insert with radial projections (e.g., a circular patch with radial projections). In some embodiments, the composite is a repaired composite. The composite, for example, a repaired composite, can comprise two discontinuous areas of composite material, wherein one area (i.e., the insert) has a CPRP shape and the other area (e.g., the remaining original composite of a damaged composite after removal of damaged area) can entirely surround the area with the CPRP shape, further wherein said two discontinuous areas are bonded to one another by a polymeric matrix (e.g., the same polymeric matrix as present in one or both of the two discontinuous areas of composite). Typically, the gap between the two areas (insert and remaining original composite) is approximately the same all the way around the perimeter of the insert and typically ranges from between about 1 mm and about 2.5 mm.

In some embodiments, the damaged area that is replaced with an insert (e.g., a composite insert, optionally comprising a circular patch with radial projections (CPRP) comprises all of the damage of a particular section of damaged composite or of the whole damaged composite. In some embodiments, the insert and the damaged composite (i.e., including the remaining original composite in the repaired composite) comprise the same polymeric matrix and/or the same one or more layers of fibers (i.e., the same number of fiber layers and/or fiber layers of the same orientation (e.g., unidirectional or multi-axial)). In some embodiments, the one or more layers of fibers comprise carbon fibers or glass fibers. In some embodiments, the one or more layers of fibers comprise plain weave, twill, satin, or 8 harness satin weave. In some embodiments, the one or more layers of fibers comprises at least about 4 layers.

In some embodiments, the patch is prepared using a heat vacuum assisted resin transfer molding process (HVARTM). In some embodiments, the patch is prepared from a prepreg. In some embodiments, the prepared composite patch is inserted into the damaged area using HVARTM. However, the patch could be inserted in any convenient manner. For example, the patch can be inserted manually and the resin can be applied manually (e.g., via syringe) and the resulting composite cured with heat. In some embodiments, the resin can be applied to the sides of the insert (e.g., via brush) and the insert can be inserted in the void and the resulting composite cured with heat. In some embodiments, the polymeric matrix is prepared from a resin for forming a thermoset polymeric matrix and a curing agent. In some embodiments, the resin is an epoxy resin. In some variations, one or more of a compressive strength or a tensile strength of a damaged composite repaired with an insert comprising a circular patch with radial projections is greater than a compressive strength or a tensile strength of a damaged composite repaired using a traditional circular patch. In some variations of any aspect or embodiment, the composite, e.g., a repaired composite, is a part of an airplane, a spaceship, a car, a truck, a boat, a building, a civil infrastructure installation or a piece of sporting equipment.

III. Polymeric Matrix

The selection of resin in the original composite is typically dictated by the end use of that composite; the selection of resin in the insert is generally guided by the resin of the original composite. It can be influenced by a range of factors, such as mechanical properties, environmental resistance, cost, and manufacturability. Accordingly, the properties desired in the final composite should be considered.

Representative resins and/or polymers include a "thermoset resin" and/or "thermoset polymer," respectively. The most frequently used thermosetting resins include, but are not limited to, polyesters, epoxies, phenolics, vinyl esters, polyurethanes, silicones, polyamides, and polyamide-imides.

Suitable thermoset polymer resins include, but are not limited to, polyester, epoxy, phenolic, vinyl ester, cyanate ester, polyurethane, silicone, polyamide, and polyamide-imide resins. In some embodiments, the thermoset polymer is an epoxy resin. Epoxy resins for use according to the presently disclosed subject matter include low molecular weight pre-polymers or higher molecular weight oligomers and polymers. The epoxy resin comprises at least two epoxide groups per molecule, and can be a polyfunctional epoxide having three, four, or more epoxide groups per molecule. In some embodiments, the epoxy resin is liquid at ambient temperature. Suitable epoxy resins include the mono- or poly-glycidyl derivative of one or more of the group of compounds comprising aromatic diamines, aromatic monoprimary amines, am inophenols, polyhydric phenols, polyhydric alcohols, polycarboxylic acids and the like, or a mixture thereof. In some embodiments, the epoxy resin is selected from the group comprising: (i) glycidyl ethers of bisphenol A, bisphenol F, dihydroxydiphenyl sulphone, dihydroxybenzophenone, and dihydroxy diphenyl; (ii) epoxy resins based on Novolacs; and (iii) glycidyl functional reaction products of m- or p-aminophenol, m- or p-phenylene diamine, 2,4-, 2,6- or 3,4-toluoylene diamine, 3,3'- or 4,4'-diaminodiphenyl methane. In some embodiments, the epoxy resin is selected from the diglycidyl ether of bisphenol A (DGEBA); the diglycidyl ether of bisphenol F (DGEBF); O,N,N triglycidyl-para-aminophenol (TGPAP); O,N,N-triglycidyl-meta-am inophenol (TGMAP); and N,N, N',N'-tetraglycidyldiaminodiphenyl methane (TGDDM).

The thermoset resin of the presently disclosed subject matter can be thermally curable. The addition of curing agent(s) and/or catalyst(s) to the resin mixture is optional; the use of such can increase the cure rate and/or reduce the cure temperatures, if desired. In some embodiments, one or more curing agent(s) are used, optionally with one or more catalyst(s). In some embodiments, the thermoset resin is thermally cured without the use of curing agents or catalysts.

If used, curing agents suitable for use with epoxy resins, include, but are not limited to, amines (e.g., polyamines and aromatic polyamines), imidazoles, acids, acid anhydrides, phenols, alcohols, and thiols (e.g., polymercaptans). In some embodiments, the curing agent is a polyamine compound selected from the group comprising diethylenetriamine (DETA), triethylenetetramine (TETA), tetraethylenepentamine (TEPA), ethyleneamine, aminoethylpiperazine (AEP), dicyanamide (Dicy), diethyltoluenediamine (DETDA), dipropenediamine (DPDA), diethyleneaminopropylamine (DEAPA), hexamethylenediamine, N amino-ethylpiperazine (N-AEP), menthane diamine (MDA), isophoronediamine (IPDA), m-xylenediamine (m-XDA) and metaphenylene diamine (MPDA). In some embodiments, the amine curing agent is selected from the group including 3,3' and 4-,4'-diaminodiphenylsulphone (DDS); methylenedianiline; bis (4-amino-3,5-dimethylphenyl)-1,4-diisopropylbenzene; bis (4-aminophenyl)-1,4-diiso-propyl-benzene; 4,4'methylenebis-(2,6-diethyl)-aniline (MDEA); 4,4' methylene-bis-(3-chloro, 2,6-diethyl)-aniline (MCDEA); 4,4'methylenebis-(2,6-diisopropyl)-aniline (M-DIPA); 4,4'methylenebis-(2-isopropyl-6-methyl)-aniline (M-M IPA); 4 chlorophenyl-N,N-dimethyl-urea; 3,4-dichlorophenyl-N,N-dimethyl-urea, and dicyanodiamide. Bisphenol chain extenders, such as bisphenol-S or thiodiphenol, can also be useful as curing agents for epoxy resins. Suitable curing agents further include anhydrides, particularly polycarboxylic anhydrides, such as nadic anhydride, methylnadic anhydride, phthalic anhydride, tetrahydrophthalic anhydride, hexahydrophthalic anhydride, methyltetrahydrophthalic anhydride, endomethylenetetrahydrophtalic anhydride, or trimellitic anhydride.

In some embodiments, the thermoset resin can include one or more catalyst(s) to accelerate the curing reaction. Suitable catalysts are well known in the art and include Lewis acids or bases. Specific examples include compositions comprising boron trifluoride, such as the etherates or amine adducts thereof (for instance the adduct of boron trifluoride and ethylamine).

The most common resins for aerospace applications are thermoset resins, such as esters and epoxies. Some of the most common epoxies used are tetraglycidyl methylene dianiline (TGMDA) and diglycidyl ether of biphenol A (DGEBA). Thermoset resins polymerize to a permanently solid and infusible state upon the application of heat. Once the thermoset resin has hardened, it cannot be reliquidified without damaging the material. Thermoset resins have excellent adhesion, high thermal stability, high chemical resistance and less creep than thermoplastics. Since their viscosity is low, the fabric can be completely wetted prior to the end of the gel time.

Vinyl ester resins have a higher failure strain than polyester resins. This characteristic improves the mechanical properties, the impact resistance, and the fatigue performance. In some examples, the formulation process for vinyl esters comprises weighing out and mixing a promoter, a catalyst, and a retarder by specific percentages to the resin weight. The promoter expedites the curing process. The catalyst promotes or controls the curing rate of the resin and the retarder absorbs any free radicals remaining once the exothermic reaction begins.

As stated previously, the thermoset resin cures when heat is applied. In some examples, the heat is generated by the interaction of the resin with the catalyst. The other two components control the rate of cure. Most vinyl esters cure at ambient room temperature. Thermoplastic resins flow when subjected to heat and pressure, and then solidify on cooling without undergoing cross-linking. Thermoplastic resins can be reliquidified since the material does not cross-link.

Polymerization is the chemical reaction in which one or more small molecules combine to form a more complex chemical, with a higher molecular weight. Typical examples are polyethylene, nylon, rayon, acrylics and PVC (polyvinyl chloride). Cross-linking is the joining or intermingling of the ends of the chemical bonds that make the material stronger and harder to pull apart, thus providing good mechanical properties.

Vinyl ester resins (or esters generally) can be chemically similar to both unsaturated polyesters and epoxy resins. They were developed as a compromise between the two materials, providing the simplicity and low cost of polyesters and the thermal and mechanical properties of epoxies. Vinyl esters can also be used in wet lay-ups and liquid molding processes such as RTM. Unsaturated polyester resins are Alkyd thermosetting resins characterized by vinyl unsaturation in the polyester backbone. The definition of unsaturation is any chemical compound with more than one bond between adjacent atoms, usually carbon, and thus reactive toward the addition of other atoms at that point. Alkyd resins are polyesters derived from a suitable dibasic acid and a polyfunctional alcohol. A dibasic acid is an acid that contains two hydrogen atoms capable of replacement by basic atoms or radicals. A radical is either an atom or molecule with at least one unpaired electron, or a group of atoms, charged or uncharged, that act as a single entity in the reaction. Carboxyl groups also react with amine groups to form peptide bonds and with alcohols to form esters. Condensation polymerization occurs when monomers bond together through condensation reactions. Typically, these reactions are achieved through reacting molecules that incorporate alcohol, amine, or carboxylic acid (also known as organic acid) functional groups. These unsaturated polyesters are most widely used in reinforced plastics.

Epoxy resins are a family of thermosetting resins generally formed from low molecular weight diglycidyl ethers of bisphenol A. Depending on the molecular weight, the resins range from liquids to solids and can be cured with amines, polyamides, anhydrides or other catalysts. Epoxy resins are also widely used in reinforced plastics because they have good adhesion to fibers. In addition, their low viscosities are effective in wetting various reinforcing materials. In the aerospace market, the most widely used resins are epoxy resins. They have a high curing temperature of around 350° F. (177° C.), which places their Tg at 302° F. (150° C.). Tg is the glass transition temperature. Epoxies have high fracture toughness, which make their fatigue performance superior to vinyl esters. They also have a low cure shrinkage rate compared to vinyl esters, so there is less possibility of cracking or crazing during the cure of components. The formulation of epoxies is also simple; it can comprise two parts, the epoxy and the curing agent. The ratio of these two components provides the rate at which the mixture cures. The epoxy determines the mechanical properties and the curing agent determines the cure temperature. Some of the most common epoxies used are TGMDA (tetraglycidyl methylene dianiline) and DGEBA (diglycidyl ether of biphenol A). The TGMDA epoxy has higher mechanical properties and higher Tg than the DGEBA epoxy. The DGEBA epoxy has a higher failure strain and lower water absorption than the TGMDA epoxy.

Additional examples of suitable resins include those having comparable characteristics to DM 411-350 vinyl ester manufactured by the Dow Chemical Company, Inc. and resin systems sold under the tradename EPON® (Hexion Inc., Columbus, Ohio, United States of America), such as EPON® 9504, EPON® 862 and EPON® 826. Both resins types have high Tg's. DM411-350 is used in adverse chemical environments, and its applications include chemical processing, pulpwood, and paper processing. It is used in the food and beverage industry, but it is not currently being used in aerospace applications. EPON® resins have high tensile strength and elongation properties, which can be important in composite applications. EPON® resins used in a two-part system. The second part is a curing agent, such as that sold under the tradename EPIKURE® (Hexion Inc., Columbus, Ohio, United States of America). The EPON® resins have viscosities that work well between the 100° F. to 350° F. (37.8° C. to 177° C.) range and are easy to mix and work with in the manufacture of composites. Suitable ratios of resin and curing agent are known in the art.

IV. Fibers/Fabrics

The selection of fibers for the original composites disclosed herein is guided, in some embodiments, by the end use of the composite and can be influenced by a range of factors, such as mechanical properties, cost, and manufacturability. Accordingly, the properties desired in the final composite should be considered. The selection of fibers for the insert is generally guided by the composition of the original composite. For example, the selection of a particular unidirectional fiber or woven fibers can be based on the shape needed for the composite and a person having ordinary skill in the art is able to identify the most appropriate choice.

Typically, fibers employed in the methods of the presently disclosed subject matter comprise carbon fibers or glass fibers. The fibers can be unidirectional, woven, or non-woven. In some embodiments, the one or more layers of unidirectional or woven fibers comprise plain weave, twill weave, satin weave, 4 harness satin weave, 5 harness satin weave, or 8 harness satin weave. Non-woven fibers can be unidirectional, providing high strength benefit, while woven fibers can improve workability. The choice between woven and non-woven and the type of weave is based at least in part on the targeted use for the manufactured composite.

Carbon fibers are well-known to those of skill in the art and include components of carbon fiber reinforced polymers, generally prepared from polyacrylonitrile, rayon or petroleum pitch.

A variety of glass fibers are known to those of skill in the art, including but not limited to, electric grade fiberglass (E-glass; low alkali borosilicate glass), structural grade fiberglass (S-glass; a high strength magnesia-alumina-silicate) and resistance grade fiberglass (R-glass; a high strength alumino silicate glass that does not contain magnesium oxide or calcium oxide).

The fibers can also be made from high-strength materials such as ceramics, including but not limited to, alumina, alumina-silica, zirconia, mullite, silicon carbide, as well as quartz.

V. Repair Insert

As demonstrated herein, a new insert, e.g., a core geometry having radial projections, such as a CPRP, for a composite repair insert/patch has been identified. As shown herein, the CPRP shape has an improved compressive load transfer mechanism compared to previous repair insert/patch shape lacking the radial projections of the presently disclosed inserts/patches. Typically, the presently disclosed insert/patch has finger-like projections on the periphery, generally in multiples of 4 (e.g., 4, 8, 12, 16, 20, etc), spaced around, e.g., evenly spaced, around the center portion of the patch. Generally, the radial projections can be as long or longer than they are wide. In some embodiments, the edges and the ends of the radial projections can be slightly rounded to avoid sharp angles thereby preventing high stress concentrations. The size of the insert and the size of the damage generally informs the choice of the number of radial projections, as the insert should robustly respond to compression without buckling. Buckling and related premature failure can be observed with inserts comprising more than 16 radial projections around the center circle. Fewer than 16 projections can yield lower overall improvements in the compressive strength of the repaired composite. Accordingly, in some embodiments, the CPRP comprises a circular main body/core geometry and 16 radial projections.

A round or circular patch containing radial projections in multiples of 3 or 5 or 6 (e.g. 3, 6, 9, 12 or 5, 10, 15, 20, or 6, 12, 18) can be employed where appropriate, but the risk of an uneven load distribution, and thus earlier failure, needs to be evaluated. When the load stability is adequate for the intended use, projections of 3 or 5 or 6, or multiples thereof, can be used.

Figure 8:
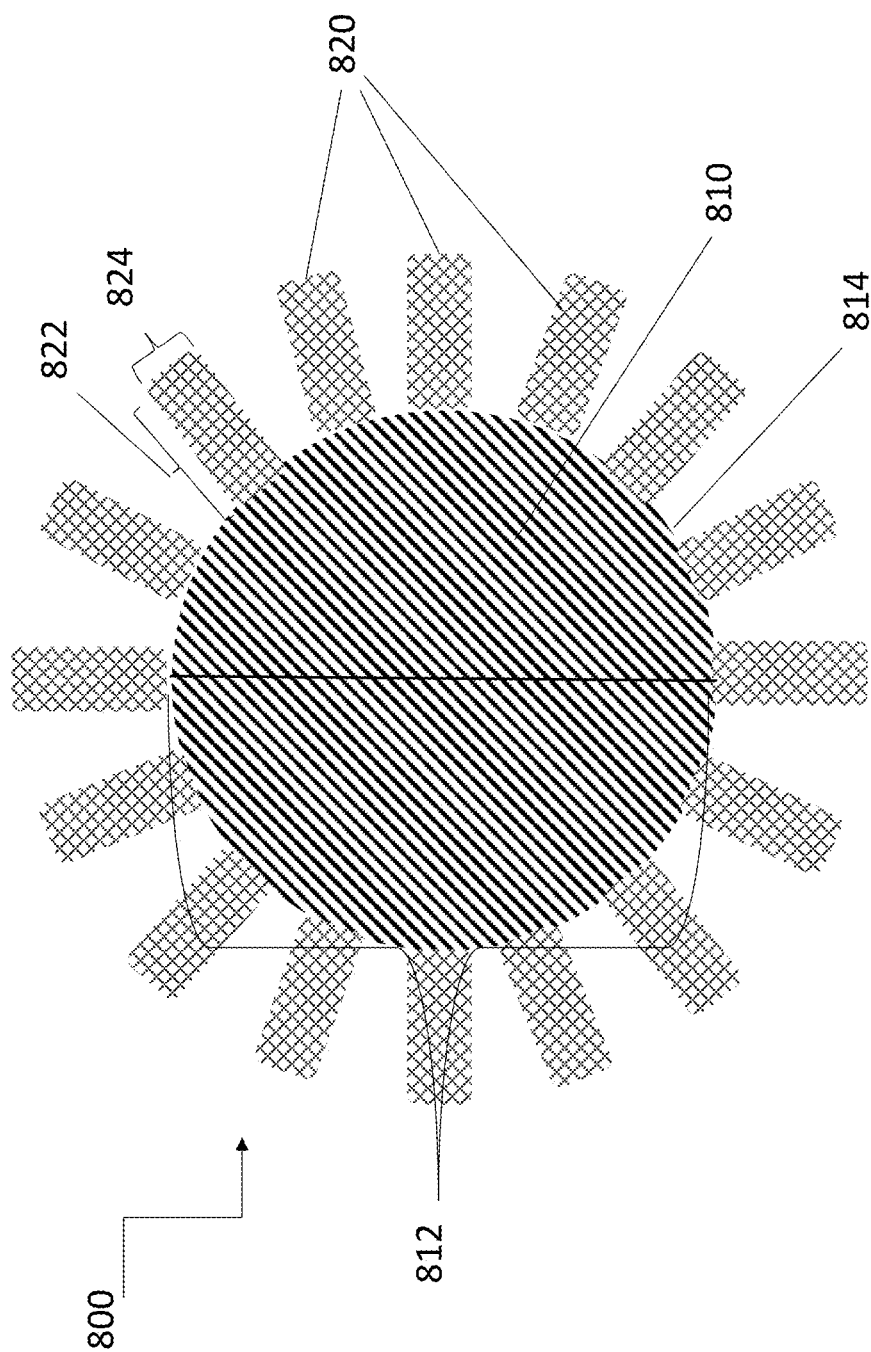
FIG. 8 is a schematic drawing showing the shape of an exemplary circular patch with radial projections (CPRP) composite insert of the presently disclosed subject matter that includes 16 radial projections.
Figure 9:
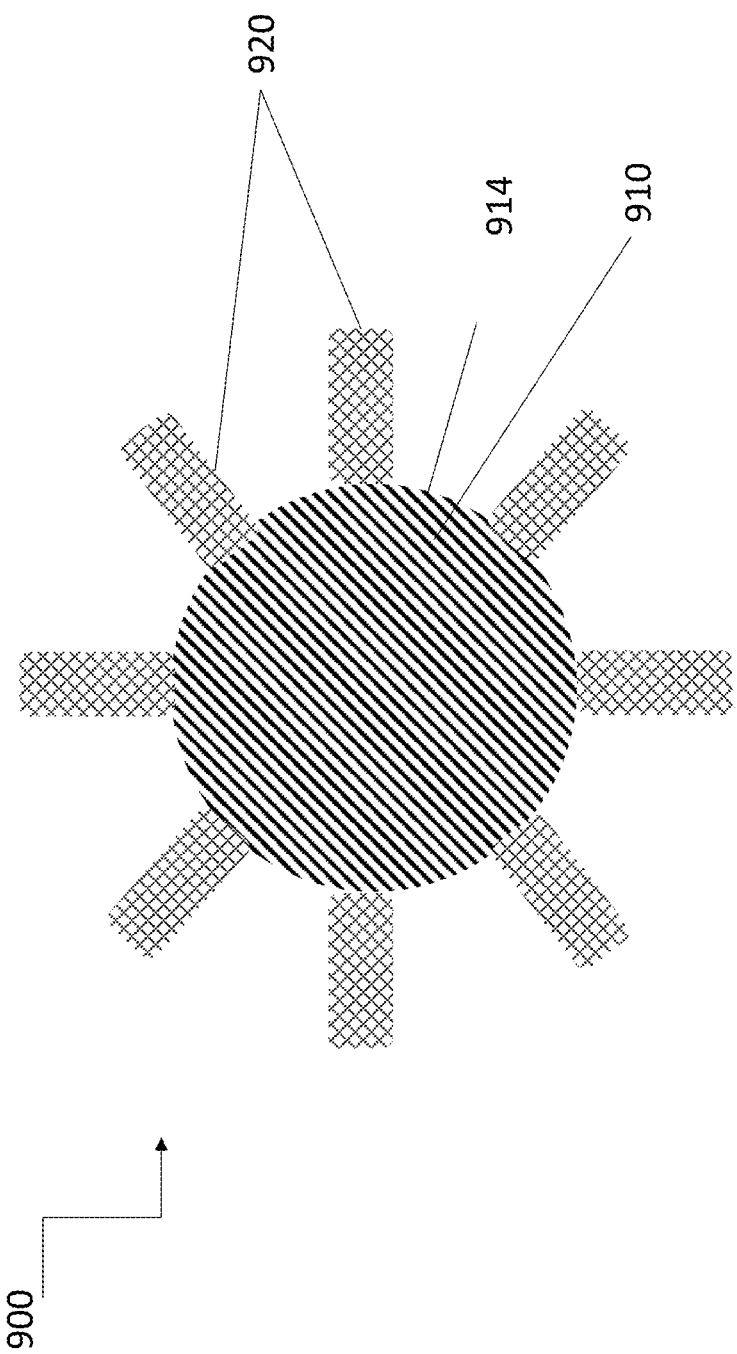
FIG. 9 is a schematic drawing showing the shape of an exemplary circular patch with radial projections (CPRP) composite insert of the presently disclosed subject matter that includes 8 radial projections.

FIGS. 8 and 9 show schematic diagrams of top-views of exemplary CPRP of the presently disclosed subject matter. FIG. 8, for example, shows CPRP 800 having circular main body (i.e. circular core geometry) 810 and 16 radial projections 820. Main circular body 810 has a diameter 812. Radial projections 820 are distributed uniformly around outer surface 814 of main body 810 and each radial projection 820 has length 822 and width 824. FIG. 9 shows an exemplary CPRP 900 having circular main body (i.e., circular core geometry) 910 and eight radial projections 920 spaced even around outer surface 914 of circular main body 910.

In some embodiments, the longest length (e.g. diameter) of the core geometry of an insert of the presently disclosed subject matter is typically no more than about 150 mm or no more than about 100 mm. In some embodiments, projection lengths are usually between about 1/10th to about 1/2 (e.g., about one tenth, one eight, one sixth, one fifth, one fourth, one third or about one half) of the longest measured distance of the core geometry, typically the diameter. For example, a core with a longest measurement (e.g., diameter) of about 100 mm can have projections that are typically no more than about 50 mm; and a core with a longest measurement (e.g., diameter) of about 50 mm can have projections that are typically no more than about 25 mm. In some embodiments, the projection length of an insert of the presently disclosed subject matter is about 10 mm to about 40 mm. Generally each projection has a width of about 10 mm, alternately, each projection has a width of about 5 mm, about 6 mm, about 7 mm, about 8 mm, about 9 mm, about 11 mm, about 12 mm, about 13 mm, about 14 mm or about 15 mm; alternately each projection has a width of between about 5 mm and about 15 mm.

Figure 10A:
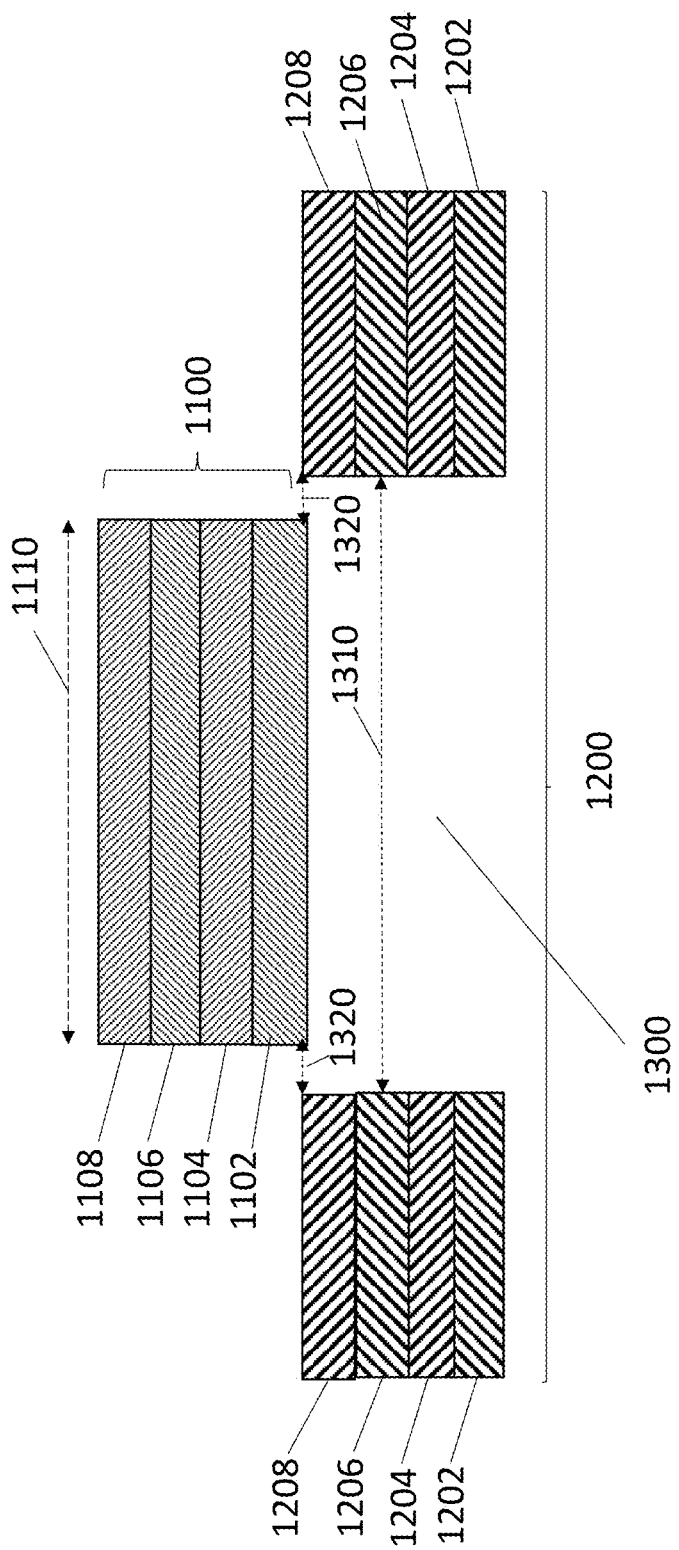
FIG. 10A is a schematic drawing showing a cross-sectional side view of a damaged composite panel with a void where the damaged area has been cut around and removed and with a repair composite insert positioned above the void.

FIG. 10A shows the side view of damaged composite 1200 after the damaged area has been cut out to provide void 1300, i.e., to prepare the damaged composite for repair. Damaged composite 1200 (i.e., remaining original composite from a damaged composite) comprises a polymer matrix infused into four layers of fibers, layers 1202, 1204, 1206, and 1208. Above void 1300 is composite repair insert 1100, which like damaged composite 1200, comprises a polymer matrix infused into four layers of fibers, layers 1102, 1104, 1106, and 1108. The side view of FIGS. 10A and 10B looks directly toward the side of the end of one of the radial projections of insert 1100, i.e., which can be analogous, for example, to radial projection 820 of CPRP 800 of FIG. 8. In some embodiments, fiber layers 1102, 1104, 1106, and 1108 of insert 1100 can comprise the same type or types of fibers as fiber layers 1202, 1204, 1206, and 1208 of damaged composite 1200. In some embodiments, damaged composite 1200 and composite repair insert 1100 can comprise the same polymeric matrix. Insert 1100 is slightly smaller than void 1300. Thus, width 1110 of the section of insert 1100 is slightly smaller than corresponding width 1310 of void 1300, such that after insert 1100 is inserted into void 1300, there will be a small gap around the sides of insert 1100, having width 1320.

Figure 10B:
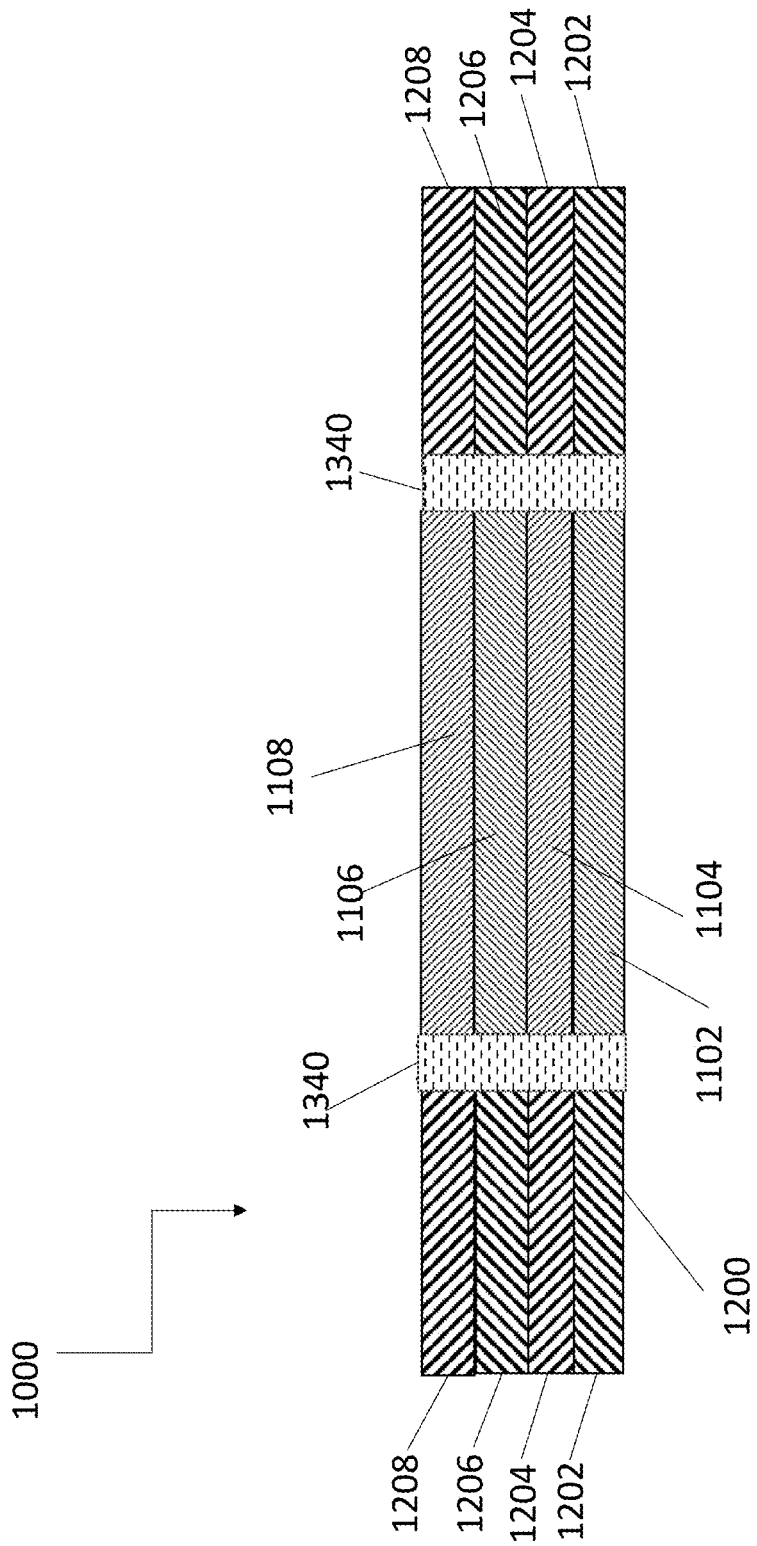
FIG. 10B is a schematic drawing showing a cross-sectional side view of repaired composite formed after the repair composite insert shown in FIG. 10A is inserted into the void of the damaged composite panel and resin has been inserted into the gap between the damaged composite panel and the repair composite insert and cured.

FIG. 10B shows repaired composite 1000, which corresponds to the figure shown in FIG. 10A after insert 1100 is inserted into void 1300 of FIG. 10A. In repaired composite 1000 of FIG. 10B, resin has been inserted into gaps around insert 1100 and cured to provide areas 1340 of cured polymer that bond insert 1100, with fiber layers 1102, 1104, 1106, and 1108, to damaged composite 1200 (i.e., the remaining original composite), with fiber layers 1202, 1204, 1206, and 1208.

While FIGS. 10A and 10B show that the same area is cut out of damaged composite 1200 though the entire thickness of composite 1200 (e.g., so that there are straight edges along the sides of void 1300 cut out of damaged composite 1200) and that the sides of repair composite insert 1100 are also straight, in some embodiments, the damaged area can be cut out so that void 1300 becomes wider on one side of the damaged composite, e.g., such that the sides of void 1300 taper from the bottom to the top of damaged composite 1200. Repair composite insert 1100 can then be cut in a corresponding tapered or cone shape.

EXAMPLES

The following examples are for illustrative purposes only and are not intended to be a detailed catalogue of all the different ways in which the present invention may be implemented or of all the features that may be added to the present invention. One skilled in the art will appreciate that the following Examples are exemplary and that numerous changes, modifications, and alterations can be employed without departing from the scope of the presently disclosed subject matter.

Example 1

Fabrication of Composites

Plain weave carbon fabric with a tow size of 3K (3000) (Fibre Glast Development Corp., Brookville, Ohio, United States of America) was used as the fibers. The epoxy resin was phenol formaldehyde polymer glycidyl ether (commercially available under the trade name EPON®862, Hexion, Inc., Columbus, Ohio, United States of America), and the curing agent (hardener) was diethylmethylbenzediamnine (commercially available under the tradename EPIKURE® W, Hexion, Inc., Columbus, Ohio, United States of America).

According to manufacturer instructions, EPON®862 and curing agent W were mixed at a weight ratio of 100:26.4, followed by heating and degassing. The mixture was then infused into the dry stacked carbon fabric described above using the HVARTM (Heated vacuum assisted resin transfer molding) process, as generally disclosed in U.S. Pat. No. 9,114,576, herein incorporated by reference in its entirety. Throughout the infusion, the temperature at the top and bottom plate was maintained at 45° C. After the infusion was completed, the laminate was cured in an oven with vacuum at 131° C. for 4 hours.

Example 2

Damage Repair

All 152.4 mm×101.6 mm samples as well as the patches were cut from the same composite laminate panel to ensure homogeneity of the composite properties. In practical application, using the same composite material to repair damage can help provide good structural integrity of the repaired panel by avoiding a mismatch of thermal and/or mechanical properties between composite materials of the original composite and repair patch which can cause inferior repair of panels.

Figure 1A:
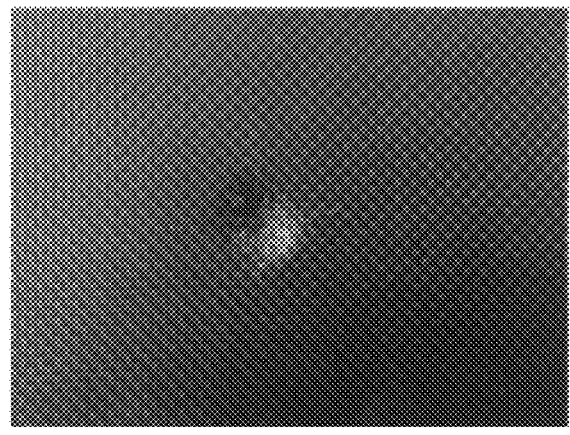
FIG. 1A is an image of the front of a composite laminate with impact damage.

Impact Test (ASTM D7136):

The Drop Weight Impact Tests were performed by using testing equipment available under the tradename INSTRON® Dynatup 9250G (Illinois Tool Works, Inc., Glenview, Ill., United States of America). The samples were clamped using an ASTM D7136 standard fixture (according to D30 Committee, "Test Method for Measuring the Damage Resistance of a Fiber-Reinforced Polymer Matrix Composite to a Drop-Weight Impact Event," ASTM International). The weight of the impactor was 18 kg at an impact height of 38 cm. The velocity of the impactor was calculated using the formula $v=\sqrt{2gH}$ (g=acceleration due to gravity, H=drop height). The actual impact force was measured by a machine integrated load cell. The front and back view of a damaged sample are shown in FIGS. 1A and 1B.

In some variations as noted below, samples were subjected to drop weight impact test (impactor mass=18 kg) from various drop heights i.e. with different impact velocities.

Figure 2A:
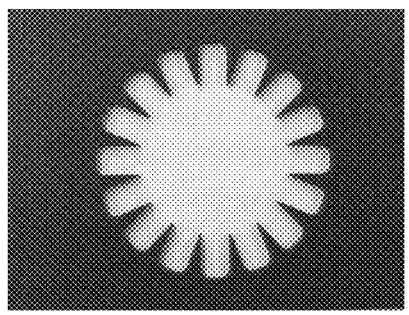
FIG. 2A is an image of a damaged composite after the damage has been cut around in a circular patch with radial projections (herein "CPRP") pattern.
Figure 2B:
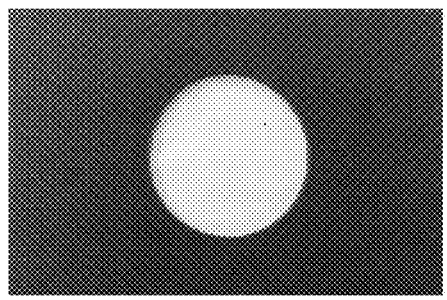
FIG. 2B is an image of the damaged composite of FIG. 2A after the circular patch with radial projections (CPRP) pattern cut out has been removed.
Figure 2C:
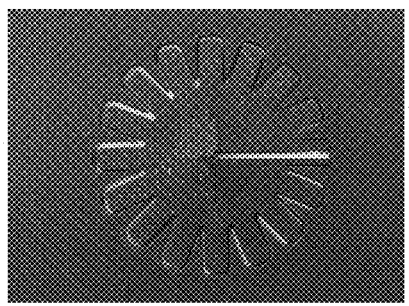
FIG. 2C is an image of a damaged composite after the damage has been cut around in a circular patch (CP) pattern.
Figure 2D:
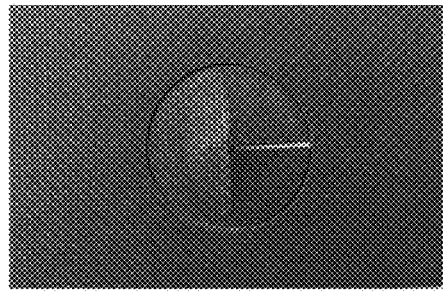
FIG. 2D is an image of a damaged composite of FIG. 2C after the circular patch (CP) pattern cut out has been removed.

The damaged parts were cut out of the panel using a programmable water jet cutter (Mach 2 1313b, Flow International Corporation, South Kent, Wash., United States of America) in a shape corresponding to the repair insert. In the sample according to the present subject matter, a damaged part corresponding to a circular patch of 5.5 cm diameter with 16 radial projections (CPRP) each of 1.5 cm was cut (see FIG. 2A) and removed from a damaged sample. See FIG. 2B. In the control sample, a damaged part corresponding to a circular patch (CP) of 5.5 cm diameter was cut (see FIG. 2C) and removed. See FIG. 2D.

Figure 3B:
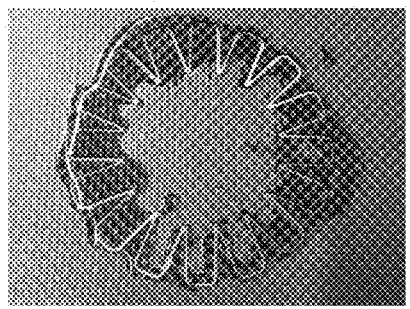
FIG. 3B is an image of the composite shown in FIG. 3A after the epoxy resin and hardener has been applied to the circular patch with radial projections (CPRP) repair composite/insert seam.
Figure 3D:
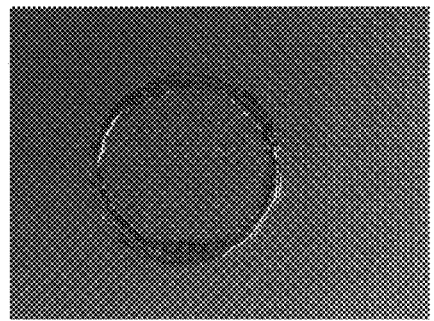
FIG. 3D is an image of the composite shown in FIG. 3C after the epoxy resin and hardener has been applied to the circular patch (CP) composite/insert seam.
Figure 3A:
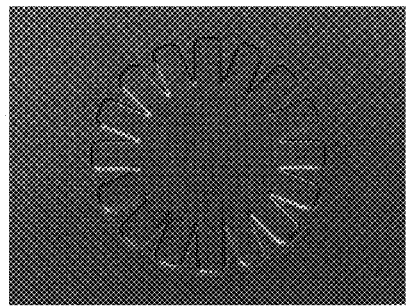
FIG. 3A is an image of a composite with a repair composite/insert aligned with the circular patch with radial projections (CPRP) cutout of the damaged composite of FIG. 2B.
Figure 3C:
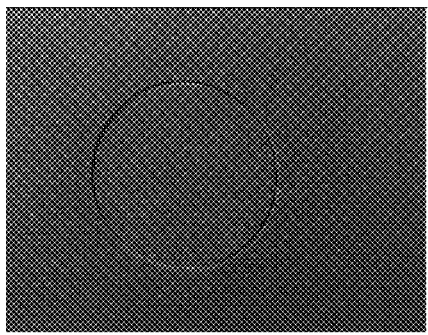
FIG. 3C is an image of a composite with a repair composite/insert aligned with the circular patch (CP) cutout of the damaged composite of FIG. 2D.

CP and CPRP insert patches having geometries corresponding to the removed damaged parts were cut out from an undamaged composite laminate panel prepared using HVARTM; optionally the panel can be prepared using prepregs. The patch sizes were slightly smaller (~1 mm clearance) than the parts removed from the damaged panels. The CPRP insert patch was inserted in a test damaged panel (see FIG. 3A) and EPON® 862 resin mixed with hardener was applied in the clearance region between the patch and the panel. The resin was cured in an oven at 250° F. (121° C.) for 4 hours to conclude the repairing process. See FIG. 3B. The CP insert patch was analogously used to complete the corresponding repair in the control sample. See FIG. 3C and FIG. 3D.

Compression after Impact Test:

The compression test was done in an ASTM D7137 fixture using a testing machine sold under the tradename INSTRON® 3384 Universal Testing Machine (Illinois Tool Works, Inc., Glenview, Ill., United States of America) according to ASTM D7137 (D30 Committee, "Test Method for Compressive Residual Strength Properties of Damaged Polymer Matrix Composite Plates," ASTM International). The specimen axis was aligned with compression load axis to minimize buckling.

The compressive strengths of each of the original panel, the damaged (unrepaired) panel, the comparison repaired panel, and the repaired panel of the presently disclosed subject matter were measured.

Results

Figure 4B:
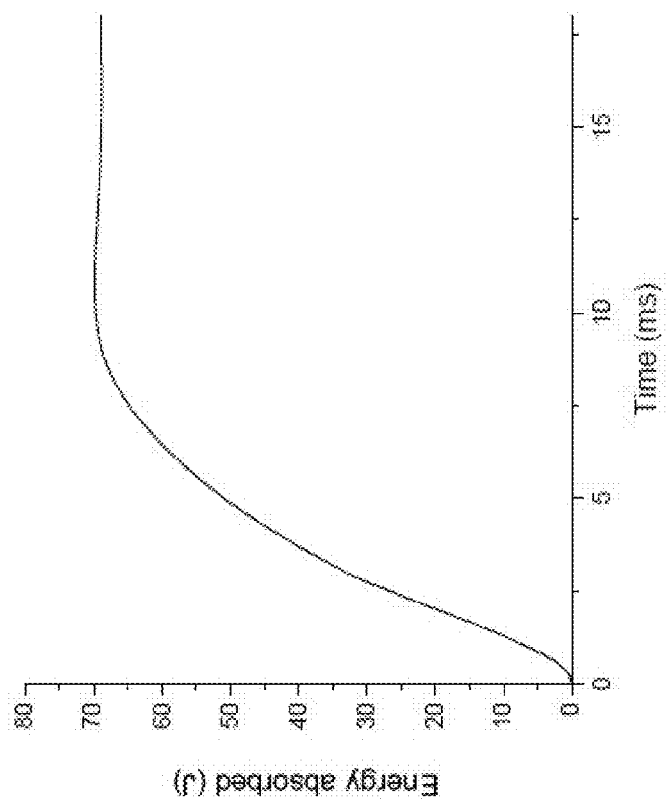
FIG. 4B is a graph showing energy absorption (in joules (J)) versus impact time (in milliseconds (ms)) for an unrepaired composite laminate.
Figure 4A:
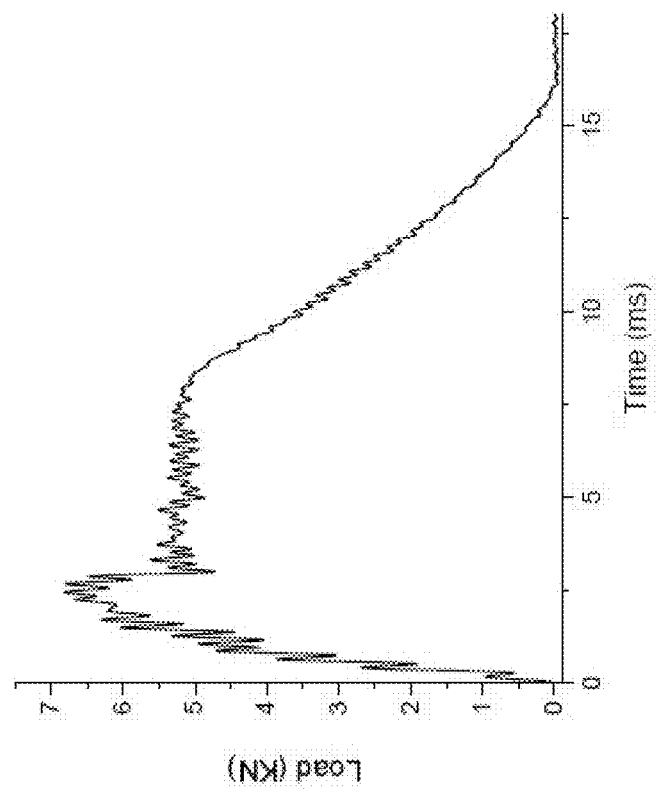
FIG. 4A is a graph showing peak load (in kilonewtons (KN)) versus impact time (in milliseconds (ms)) for an unrepaired composite laminate.

Insipient damage for the composite laminate samples occurred at a drop height of 5 cm (impactor velocity of 1 m/s); the impactor started to penetrate the sample at a drop height of 38 cm (impactor velocity of 2.73 m/s). Moving forward, all specimens for this study were subjected to an impact from 38 cm drop height. FIGS. 4A and 4B show the plots of peak load and absorbed energy against impact time. The damage was induced in the specimen by performing the low velocity impact test described herein. The curves represent the load distribution and energy absorption at the point of impact, showing the extent of damage that was induced.

All specimens were subjected to this impact damage except the control sample (undamaged sample). As the specimens were identical and the drop height was the same for all impacts, load and energy absorption plots were essentially identical. Thus, only one curve is presented for the original undamaged and unrepaired samples. As shown, the composite loses its load carrying capacity at around 6.5 KN and is damaged, after which the composite contains some residual stiffness that prevents total failure. Fluctuations of the peak load data can be interpreted as major fiber damage that occurred during impact, that is, the extent of the impact damage. As shown in FIG. 4B, the composite of the present example took about 60-70 J before failure. Preparation of thicker composites can yield military grade laminates, which generally have a maximum energy tolerance of about 100 J.

Figure 5:
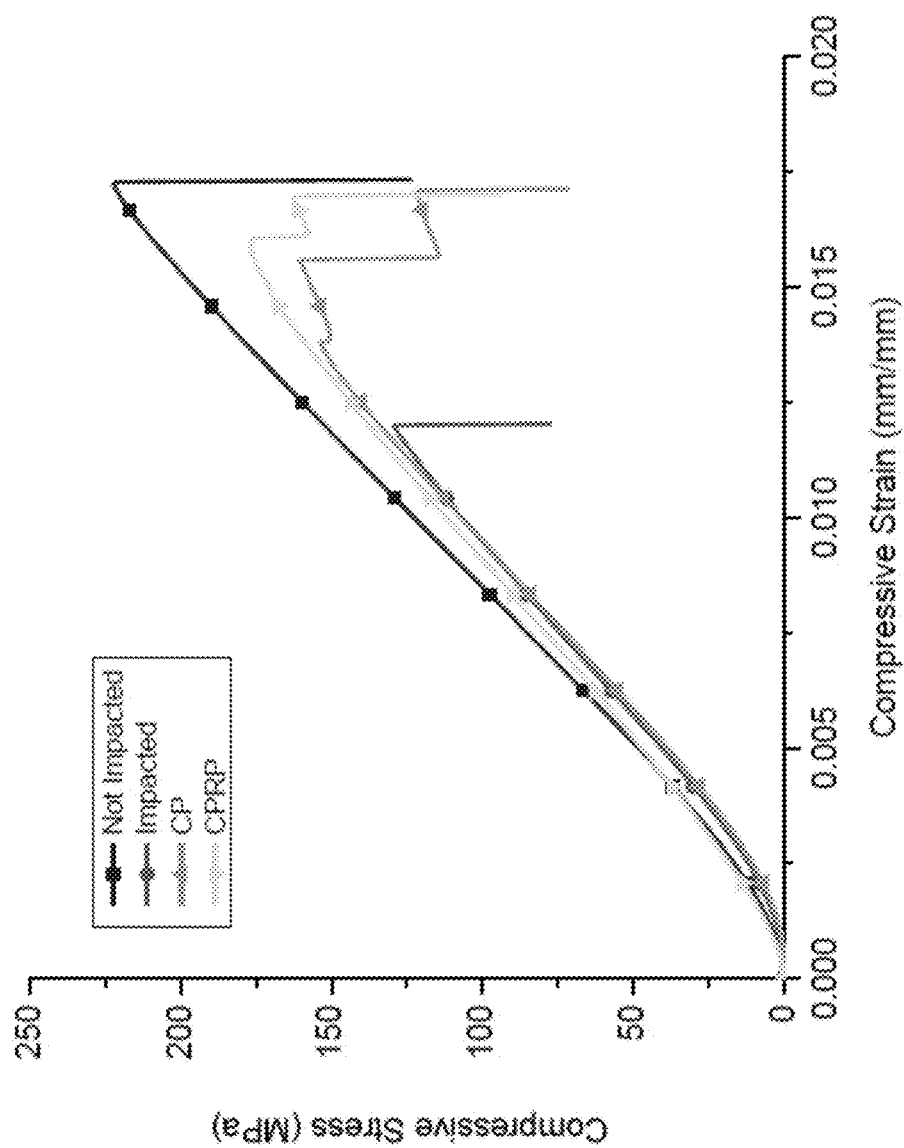
FIG. 5 is a graph showing compressive stress response (measured in megapascals (MPa)) as a function of compressive strain (measured in millimeter per millimeter (mm/mm)) for various samples: a non-impacted (i.e., non-damaged) composite (data shown with squares); an impacted composite (data shown with circles); a damaged composite repaired with a circular patch (CP) composite insert (data shown with upward pointing triangles); and a damaged composite after repair with a circular patch with radial projections (CPRP) composite insert (data shown in downward pointing triangles).

After impact, the damaged region in the composite laminate was cut out and replaced with a patch insert. The repaired specimens were subjected to compression after impact test according to ASTM D7137 as disclosed above. Results are listed in Table 1 and the compressive stress was plotted against compressive strain. See FIG. 5.

TABLE 1

Parameters obtained from compression after impact test

| Sample | Compressive Strength (MPa) | Retained Compressive Strength (%) |
|---|---|---|
| Not Impacted | 220.7 ± 16.9 | — |
| Impacted | 128.3 ± 2.9 | 58.1 |
| Circular patch (CP) | 159.6 ± 3.6 | 72.3 |
| Circular patch with radial projection (CPRP) | 177.6 ± 3.8 | 80.5 |

Figure 6:
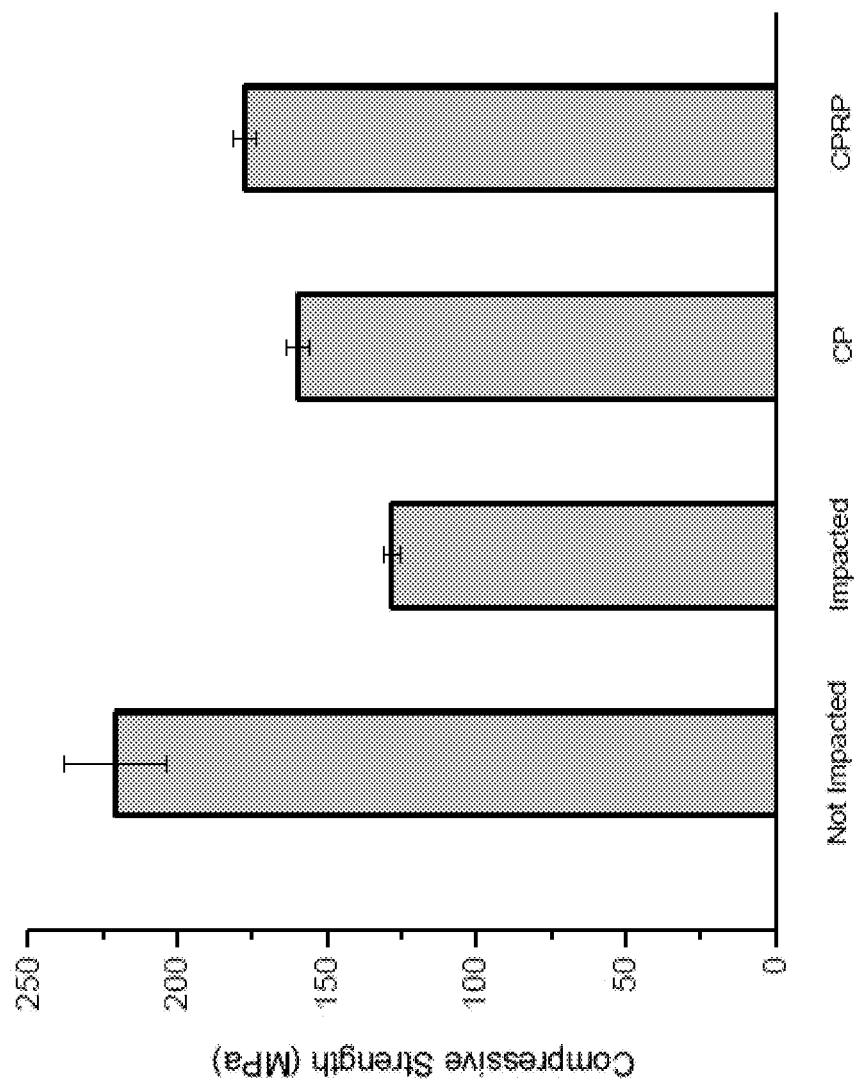
FIG. 6 is graph showing compressive strength (measured in megapascals (MPa)) after impact in various samples: non-impacted (i.e., non-damaged) composite; an impacted composite; a damaged composite repaired with a circular patch (CP) composite insert; and a damaged composite after repair with a circular patch with radial projections (CPRP) composite insert.

The specimen that was impacted but not repaired showed a compressive strength of 128.3 MPa or 58.1% of the undamaged specimen. The specimen with the circular patch (CP) showed good recovery (72.3% retention). However, the CPRP-repaired specimen of the presently disclosed subject matter exhibited significantly more compressive strength (80.5% retention). With other parameters kept similar, incorporation of radial projections in the CPRP resulted in nearly 12% more compressive strength than the CP sample. See FIG. 6.

Figure 7:
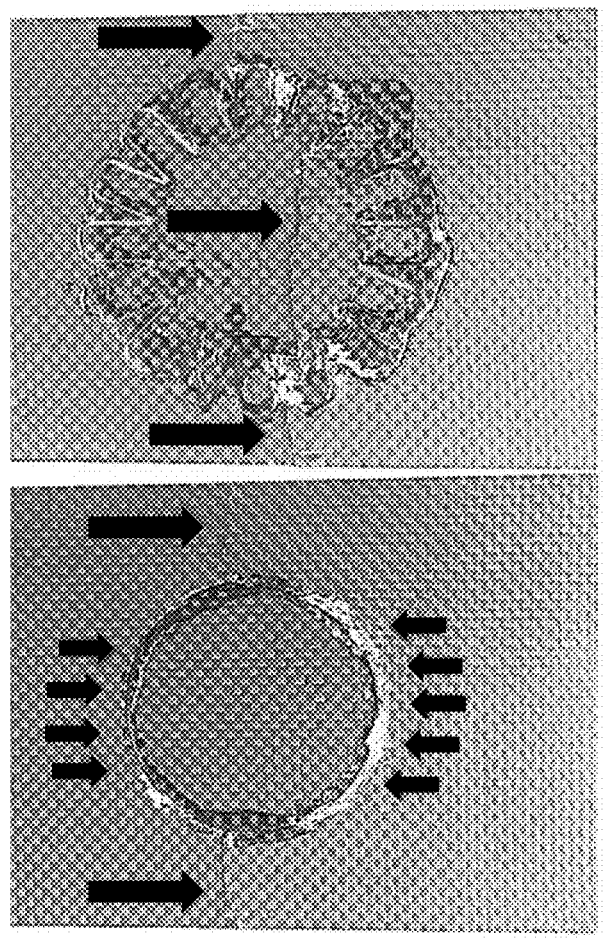
FIG. 7A is an image of failed repaired composite laminate after repair with a circular patch (CP) composite insert. The arrows highlight the locations of fracture progression.
FIG. 7B is an image of failed repaired composite laminate after repair with a circular patch with radial projections (CPRP) composite insert of the presently disclosed subject matter. The arrows highlight the locations of fracture progression.

FIGS. 7A and 7B show images of the fractured specimens with CP and CPRP repair after the compression test. The CP specimen showed damage in the resin along the repair joint, while the insert popped out intact and undamaged, indicating that when the CP-repaired sample was under compressive stress, the repair joint failed to transfer load to the insert patch. In contrast, the CPRP-repaired sample showed failure of the insert patch itself, indicating that bonding in the joint area provided successful transfer of the load from the composite to the insert patch. The strength of the insert patch itself is thus shown to be less relevant if the load is not successfully transferred to it.

INCORPORATION BY REFERENCE

The patents and publications listed herein describe the general skill in the art. All publications, patents, and patent applications mentioned in this specification are herein incorporated by reference to the same extent as if each individual publication, patent, or patent application was specifically and individually indicated to be incorporated by reference. In the case of any conflict between a cited reference and this specification, the specification shall control.

In describing embodiments of the present subject matter, specific terminology is employed for the sake of clarity. However, the presently disclosed subject matter is not intended to be limited to the specific terminology so selected. Nothing in this specification should be considered as limiting the scope of the presently disclosed subject matter. All examples presented are representative and non-limiting. The above-described embodiments can be modified or varied, without departing from the presently disclosed subject matter, as appreciated by those skilled in the art in light of the above teachings. It is therefore to be understood that, within the scope of the claims and their equivalents, the presently disclosed subject matter can be practiced otherwise than as specifically described.

What is claimed is:

1. A method of repairing a damaged composite, the method comprising:
    (a) providing a composite comprising a polymeric matrix and one or more layers of fibers, wherein said composite has a damaged area; and
    (b) replacing the damaged area of said composite with an insert comprising a core geometry and radial projections, wherein the insert is prepared using at least one of a heat vacuum assisted resin transfer molding process (HVARTM) or a prepreg and wherein the replacing comprises cutting around the damaged area to create a void in the composite, wherein the void has a shape corresponding to the insert; inserting the insert into the void; applying a resin; and curing the resin.

2. The method of claim 1, wherein said insert comprises a circular patch with radial projections.

3. The method of claim 1, wherein said insert and said composite comprise the same polymeric matrix and the same one or more layers of fibers.

4. The method of claim 1, wherein said one or more layers of fibers comprise carbon fibers or glass fibers.

5. The method of claim 4, wherein said one or more layers of fibers comprise at least 4 layers.

6. The method of claim 1, wherein said insert comprises 8, 12, 16, 20, or 24 radial projections.

7. The method of claim 1, wherein said insert comprises a circular patch with at least 16 radial projections.

8. The method of claim 1, wherein said polymeric matrix of the composite is prepared from an epoxy resin and a curing agent.

9. The method of claim 2, wherein one or both of a compressive strength and a tensile strength of said damaged composite repaired with an insert comprising a circular patch with radial projections is greater than one or both of a compressive strength and a tensile strength of a damaged composite repaired using a circular patch with no radial projections.

10. The method of claim 1, wherein said damaged composite is a part of an airplane, a spaceship, a car, a truck, a boat, a building, a civil infrastructure installation or a piece of sporting equipment and said replacing occurs in situ.

* * * * *